(No Model.)
C. C. TYLER.
MILLING CUTTER.
No. 435,572. Patented Sept. 2, 1890.
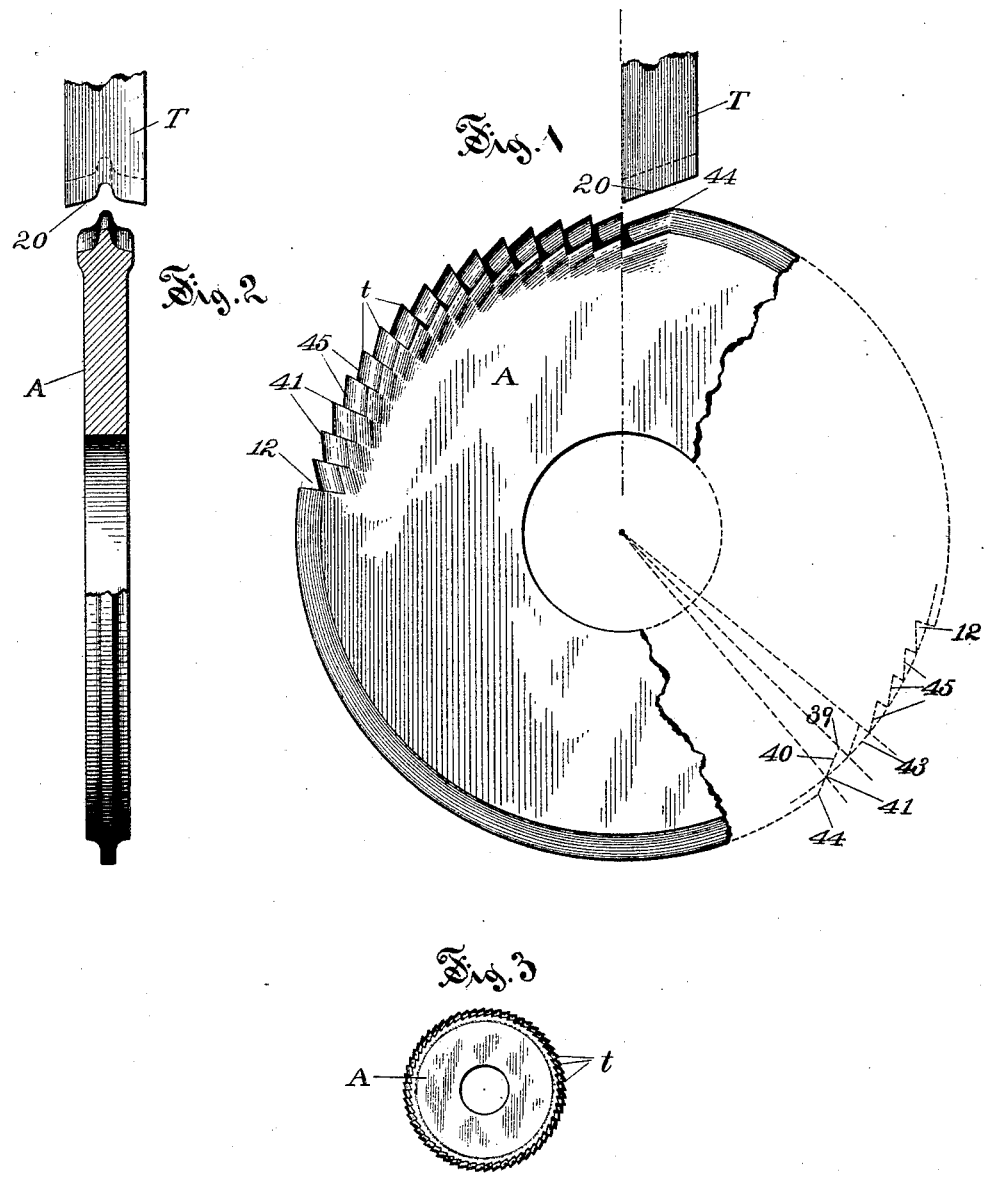
Witnesses:
W. M. Bjorkman,
Henry L. Reckard.
Inventor:
Charles C. Tyler,
By his Attorney:
F. A. Richards.

UNITED STATES PATENT OFFICE.

CHARLES C. TYLER, OF CHESHIRE, CONNECTICUT.

MILLING-CUTTER.

SPECIFICATION forming part of Letters Patent No. 435,572, dated September 2, 1890.

Application filed March 23, 1889. Serial No. 304,461. (No model.)

*To all whom it may concern:*

Be it known that I, CHARLES C. TYLER, a citizen of the United States, residing at Cheshire, in the county of New Haven and State of Connecticut, have invented certain new and useful Improvements in Milling-Cutters, of which the following is a specification.

This invention relates to milling-cutters adapted to be used for the cutting of gears and pinions, the object being to furnish such a cutter having superior qualities and which may be produced with precision and economy by the method described in my application, Serial No. 291,137.

In the drawings accompanying and forming a part of this specification, Figure 1 is a side elevation, drawn on an enlarged scale, of a partly-formed milling-cutter embodying my invention, and it illustrates in part the method of forming by compression the cutting-teeth on the cutter-blank. Fig. 2 is an edge view, partially in section, further illustrative of my present improvements. Fig. 3 is a side elevation, on a smaller scale, of a complete cutter.

Similar characters designate like parts in all the figures.

For the manufacture of my improved milling-cutters I employ the method or process described and claimed in my said prior application.

In making my improved cutters I ordinarily use an oversize blank only approximately shaped and reduce the same to the required size simultaneously with and by the forming of the teeth on said blank. By this means when making small cutters (for which my said improvement is more particularly adapted) the blanks may be first cut out, by means of cutting-dies, from sheet metal of suitable quality, and afterward cut or "toothed" without any other intermediate preparation than forming therein the usual central hole for the cutter-carrying arbor. Consequently by the said method or process I am able to produce my improved milling-cutters of a high quality and precision at a very low cost and very uniform in size and shape.

The instrumentality by means of which I ordinarily practice my invention consists of a tooth-forming compressor-tool T, having on its working-face 20 a conformation coinciding with the form of tooth to be made. This tool, when making circular cutters of a required size from an oversize blank, is always limited in its working-stroke to stop at a certain precise distance from the center of the cutter. For a more detailed description of said tool-forming tool T reference may be had to my application, Serial No. 325,681, wherein said tool is described and specifically claimed. The cutting-tooth formed by the said tool has a substantially uniform cross-sectional dimension throughout the length thereof and is set or formed on the cutter to have a decreasing radius from the point backward therefrom, one tooth extending from its own point back to the cutting-face of the next tooth.

The operation of forming a tooth consists in the compression of the blank, unheated and in its natural condition, by a suitable instrumentality, in a direction crosswise to the line of the points of the cutting-teeth and at such an angle thereto as is proper to form the required relief or "backing-off" for the tooth by a movement of the said tool in a direction parallel to the cutting-face of the tooth formed by said movement. This having been done once, as at 12, the blank is advanced (relative to such instrumentality) and another compression similarly effected. When an oversize blank is used, as shown in Fig. 1, the line 45 of the final compression extends from the root 39 of the tooth 40 upward and forward to the intersection 41 with the line 43 of the points of the cutting-teeth and beyond point 41 to the periphery 44 of the blank. The blank is now advanced through the arc (or space) from point 39 to point 41, Fig. 1, and the operation repeated. It will thus be seen that the true size of the cutter is a line extending through the points 41 of the cutting-teeth, and that the position of these points is determined by the angle of said line 45 and by the distance through which the blank is advanced between the successive compressions.

It has been customary hitherto to make cutters of this class of sheet metal by first cutting out and centrally perforating the blank and then shaping the teeth by a delicate and expensive process of milling off the superfluous metal. In my improved sheet-metal cutter herein described the said surplus of peripheral metal is not removed, but is disposed around the cutter on the sides thereof in the form of laterally-projecting rings, substantially as shown, whereby the bases of the cutting-teeth are broadened, while the middle portions of the disks remain of a flat form and unchanged in character.

Having thus described my invention, I claim—

The improved sheet-metal milling-cutter herein described, it consisting in a sheet-metal disk having cutting-teeth, substantially as described, on the periphery thereof and bordered by the surplus peripheral metal disposed into laterally-projecting rings, whereby the bases of said teeth are broadened, all substantially as described.

CHARLES C. TYLER.

Witnesses:
H. J. STEWART,
W. A. RILEY.